(12) United States Patent  
Tokuda et al.

(10) Patent No.: US 7,024,400 B2
(45) Date of Patent: Apr. 4, 2006

(54) DIFFERENTIAL LSI SPACE-BASED PROBABILISTIC DOCUMENT CLASSIFIER

(75) Inventors: Naoyuki Tokuda, Tokyo (JP); Liang Chen, Tokyo (JP); Hiroyuki Sasai, Tokyo (JP)

(73) Assignee: SunFlare Co., Ltd., Tokyo (JP)

( * ) Notice: Subject to any disclaimer, the term of this patent is extended or adjusted under 35 U.S.C. 154(b) by 820 days.

(21) Appl. No.: 09/849,984

(22) Filed: May 8, 2001

(65) Prior Publication Data

US 2003/0037073 A1  Feb. 20, 2003

(51) Int. Cl.
*G06F 17/00* (2006.01)
*G06E 1/00* (2006.01)

(52) U.S. Cl. .............. 706/56; 706/55; 706/20
(58) Field of Classification Search ........ 706/56, 706/55, 20
See application file for complete search history.

(56) References Cited

U.S. PATENT DOCUMENTS

| | | | |
|---|---|---|---|
| 6,233,575 B1* | 5/2001 | Agrawal et al. | 707/6 |
| 6,389,436 B1* | 5/2002 | Chakrabarti et al. | 715/513 |
| 6,499,665 B1* | 12/2002 | Meunier et al. | 235/487 |
| 2002/0103775 A1* | 8/2002 | Quass et al. | 706/12 |

* cited by examiner

*Primary Examiner*—George Davis
(74) *Attorney, Agent, or Firm*—Jacobson Holman PLLC

(57) ABSTRACT

A computerized method for automatic document classification based on a combined use of the projection and the distance of the differential document vectors to the differential latent semantics index (DLSI) spaces. The method includes the setting up of a DLSI space-based classifier to be stored in computer storage and the use of such classifier by a computer to evaluate the possibility of a document belonging to a given cluster using a posteriori probability function and to classify the document in the cluster. The classifier is effective in operating on very large numbers of documents such as with document retrieval systems over a distributed computer network.

9 Claims, 1 Drawing Sheet

DIFFERENTIAL LSI SPACE-BASED PROBABILISTIC DOCUMENT CLASSIFIER

BACKGROUND OF THE INVENTION

1. Field of the Invention

The present invention is related to the field of document classification and, more particularly, to a method for automatic document classification based on a combined use of the projection and the distance of the differential document vectors to the differential latent semantics index (DLSI) spaces.

2. Description of the Related Art

Document classification is important not only in office document processing but also in implementing an efficient information retrieval system. The latter is gaining importance with the explosive use of distributed computer networks such as the Internet. Currently, even the most popular document classification tasks in YAHOO® are totally done by humans. However, this method is restricted by the realities of manual capacity to the classification of a limited number of documents and is wholly insufficient to process the almost limitless number of documents available in today's highly networked environment.

The vector space model is widely used in document classification, where each document is represented as a vector of terms. To represent a document by a document vector, weights are assigned to its components usually evaluating the frequency of occurrences of the corresponding terms. Then the standard pattern recognition and machine learning methods are employed for document classification.

In view of the inherent flexibility imbedded within any natural language, a staggering number of dimensions are required to represent the featuring space of any practical document comprising the huge number of terms used. If a speedy classification algorithm can be developed, the first problem to be resolved is the dimensionality reduction scheme enabling the documents' term projection onto a smaller subspace.

Basically there are two types of approaches for projecting documents or reducing the documents' dimensions. One is a local method, often referred to as truncation, where a number of "unimportant" or "irrelevant" terms are deleted from a document vector, the importance of a term being evaluated often by a weighting system based on its frequency of occurrences in the document. The method is called local because each document is projected into a different subspace but its effect is minimal in document vectors because the vectors are sparse. The other approach is called a global method, where the terms to be deleted are chosen first, ensuring that all the document vectors are projected into the same subspace with the same terms being deleted from each document. In the process, the global method loses some of the important features of adaptability to the unique characteristics of each document. Accordingly, a need exists for ways to improve this adaptability.

Like an eigen decomposition method extensively used in image processing and image recognition, the Latent Semantic Indexing (LSI) with Singular Value Decomposition (SVD) has proved to be a most efficient method for the dimensionality reduction scheme in document analysis and extraction, providing a powerful tool for the classifier when introduced into document retrieval with a good performance confirmed by empirical studies. A distinct advantage of LSI-based dimensionality reduction lies in the fact that among all the projections on all the possible space having the same dimensions, the projection of the set of document vectors on the LSI space has a lowest possible least-square distance to the original document vectors. This implies that the LSI finds an optimal solution to dimensional reduction. In addition to the role of dimensionality reduction, the LSI with SVD also is effective in offering a dampening effect of synonymy and polysemy problems with which a simple scheme of deleting terms cannot be expected to cope. Also known as a word sense disambiguation problem, the source of synonymy and polysemy problems can be traced to inherent characteristics of context sensitive grammar of any natural language. Having the two advantages, the LSI has been found to provide a most popular dimensional reduction tool.

The global projection scheme encounters a difficulty in adapting to the unique characteristics of each document and a method must be developed to improve an adverse performance of a document classifier due to this inability.

SUMMARY OF THE INVENTION

In view of the foregoing, one object of the present invention is a document classifier method that retains adaptability to the unique characteristics of individual documents.

In accordance with this and other objects, the present invention introduces a new efficient supervised document classification procedure, whereby learning from a given number of labeled documents preclassified into a finite number of appropriate clusters in the database, the classifier developed will select and classify any of new documents introduced into an appropriate cluster within the classification stage.

The present invention is directed to a method of setting up a DLSI space-based classifier and using such classifier to evaluate the possibility of a document's belonging to a given cluster of a plurality of clusters stored in a database using a posteriori probability function. The DLSI space-based classifier is set up using a computer and is stored in a computer storage device. Once set up, the computer uses the classifier to classify documents as belonging to one of a plurality of clusters within a database on an automated basis.

At least three specific features are introduced into the new document classification scheme based on the concept of the differential document vector and the DLSI vectors. First, by exploiting the characteristic distance of the differential document vector to the DLSI space and the projection of the differential document onto the DLSI space, which denote the differences in word usage between the document and a cluster's centroid vector, the differential document vector is capable of capturing the relation between the particular document and the cluster. Second, a major problem of context sensitive semantic grammar of natural language related to synonymy and polysemy can be dampened by the major space projection method endowed in the LSI's used. Finally, a maximum for the posteriori likelihood function making use of the projection of the differential document vector onto the DLSI space and the distance to the DLSI space provides a consistent computational scheme in evaluating the degree of reliability of the document belonging to the cluster.

According to the present invention, given a document, the document vector and its normalized form can be directly set up exploiting the terms appearing in the document and their frequency of occurrences in the document, and possibly also in other documents. The centroid of a cluster is given by the average of the sums of the normalized vectors of its members. The cosine of a pair of normalized document vectors measures the length of the pair of normalized document vectors.

To obtain an intra-DLSI space, or an I-DLSI space, a differential term by intra-document matrix where each column of the matrix is constructed where each column of the matrix denotes the difference between the document and the centroid of the cluster to which the document belongs. Now, exploiting the singular vector decomposition method, the major left singular vectors associated with the largest singular values are selected as a major vector space called an intra-DLSI space, or an I-DLSI space. The I-DLSI space is effective in roughly describing the differential intra-document vectors, while the distance from a differential intra-document vector to the DLSI space can be effectively used as additive information to improve adaptability to the unique characteristics of the particular differential document vector. Given a new document to be classified, a best candidate cluster to be recalled from the clusters can be selected from among those clusters having the highest probabilities of being the given differential intra-document vector. The probability function for a differential document vector being a differential intra-document vector is calculated according to projection and distance from the differential document vector to I-DLSI space.

The extra-DLSI space, or the E-DLSI space can similarly be obtained by setting up a differential term by extra-document matrix where each column of the matrix denotes a differential document vector between the document vector and the centroid vector of the cluster which does not include the document. The extra-DLSI space may then be constructed by the major left singular vectors associated with the largest singular values. As in the intra-DLSI space, in addition to the global description capability, the space shares the improved adaptability to the unique characteristics of the particular differential document vector. Given a new document to be classified, a best candidate cluster to be recalled from the clusters can be selected from among those clusters having the lowest probabilities of being the given differential intra-document vector.

Integrating the concepts of the differential intra- and extra-document vectors, a Bayesian posteriori likelihood function is set up providing a most probable similarity measure of a document belonging to a cluster. As already noted, the projections of differential document vectors onto I-DLSI, and E-DLSI spaces, and the distances from the vectors to these spaces, according to the present invention have an advantage over the conventional LSI space-based approach; namely, in addition to the role of the length of projection of the differential document vectors, which is equivalent to that of cosines of angles in the LSI space-based approach, the distance of the differential document vectors to the projected DLSI space allows the evaluation of the similarity measure of each individual document which the global method generally fails. The present invention, using both the projections as well as the distances of differential vectors to the DLSI spaces, provides much richer information.

These and other features of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
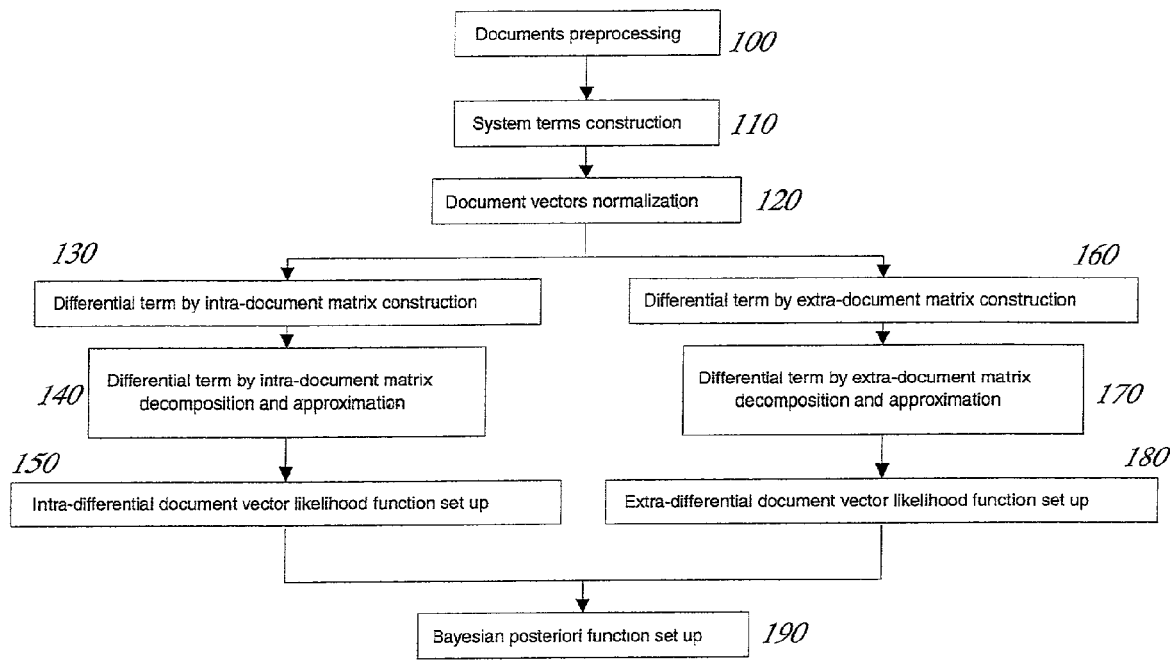
FIG. 1 is a flow diagram describing the setting up of a DLSI spaced-based classifier in accordance with the present invention.

In describing a preferred embodiment of the invention, specific terminology will be resorted to for the sake of clarity. However, the invention is not intended to be limited to the specific terms so selected, and it is to be understood that each specific term includes all technical equivalents which operate in a similar manner to accomplish a similar purpose.

To begin with a few basic concepts, a term is defined as a word or a phrase that appears in at least two documents. So-called stop words such as "a", "the", "of" and so forth are excluded. The terms that appear in the documents may representatively be selected and listed as $t_1, t_2, \ldots, t_m$.

For each document j in the collection, each of the terms with a real vector $(a_{1j}, a_{2j}, \ldots, a_{mj})$, is assigned with $a_y = f_y \cdot g_1$, where $f_y$ is the local weighting of the term $t_1$ in the document indicating the significance of the term in the document, while $g_1$, is a global weight of all the documents, which is a parameter indicating the importance of the term in representing the documents. Local weights may be either raw occurrence counts, Boolean, or logarithm of occurrence count. Global weights may be no weighting (uniform), domain specific, or entropy weighting. Both the local and global weights are thoroughly studied in the literature, and will not be discussed further herein. An example is given below:

$$f_{ij} = \log(1 + O_{ij}) \text{ and } g_i = 1 - \frac{1}{\log n}\sum_{j=1}^{N} p_{ij}\log p_{ij},$$

where $$p_{ij} = \frac{O_{ij}}{d_i},$$

the total number of times a term $t_1$ appears in the collection, $O_y$ the number of times the term $t_1$ appears in the document j, and n the number of documents in the collection. The document vector $(a_{1j}, a_{2j}, \ldots, a_{mj})$ can be normalized as $(b_{1j}, b_{2j}, \ldots, b_{mj})$ by the following formula:

$$b_{ij} = \frac{a_{ij}}{\sqrt{\sum_{k=1}^{m} a_{kj}^2}} \quad (1)$$

The normalized centroid vector $C=(c_1, c_2, \ldots, c_m)$ of a cluster can be calculated in terms of the normalized vector as $$c_i = \frac{s_i}{\sqrt{\sum_{j=1}^{m} s_i^2}},$$

where $(S_1, S_2, \ldots, S_m)^T$ is a mean vector of the member documents in the cluster which are normalized as $T_1, T_2, \ldots, T_k$. The vector $(S_1, S_2, \ldots, S_m)^T$ can be expressed as $$(s_1, s_2, \ldots, s_m)^T = \frac{1}{k}\sum_{j=1}^{k} T_j.$$

A differential document vector is defined as T−C where T and C are respectively a normalized document vector and a normalized centroid vector satisfying some criteria as given above.

A differential intra-document vector $D_I$ is the differential document vector defined as T−C, where T and C are respectively a normalized document vector and a normalized centroid vector of a cluster in which the document T is included.

A differential extra-document vector $D_E$ is the differential document vector defined as T−C, where T and C are respectively a normalized document vector and a normalized centroid vector of a cluster in which the document T is not included.

The differential terms by intra- and extra-document matrices $D_I$ and $D_E$ are respectively defined as a matrix, each column of which comprises a differential intra- and extra-document vector, respectively.

According to the posteriori model, any differential term by document m-by-n matrix of D, say, of rank i≦q=min(m, n), whether it is a differential term by intra-document matrix $D_I$ or a differential term by extra-document matrix $D_E$ can be decomposed by SVD into a product of three matrices: $D=USV^T$, such that U (left singular matrix) and V (right singular matrix) are m-by-q and q-by-n unitary matrices, respectively, with the first r columns of U and V being the eigen vectors of $DD^T$ and $D^TD$, respectively. Here S is called singular matrix expressed by $S=\text{diag}(\delta_1,\delta_2,\ldots,\delta_q)$, where $\delta_1$ are non-negative square roots of eigen values of $DD^T$, $\delta_1>0$ for i≦r and $\delta_1=0$ for i>r.

The diagonal elements of S are sorted in decreasing order of magnitude. To obtain a new reduced matrix $S_k$, the k-by-k leftmost-upper corner matrix (k<r) of S is kept and other terms are deleted. Similarly, two new matrices $U_k$ and $V_k$ are obtained by keeping the leftmost k columns of U and V respectively. The product of $U_k$, $S_k$ and $V_k^T$ provides a reduced matrix $D_k$ of D which approximately equals to D.

Selection of an appropriate value of k, a reduced degree of dimension from the original matrix, depends on the type of applications. Generally, k≧100 for 1000≦n≦3000 is chosen, and the corresponding k is normally smaller for the differential term by intra-document matrix than that for the differential term by extra-document matrix, because the differential term by extra-document matrix normally has more columns than has the differential term by intra-document matrix.

Each of differential document vector q could find a projection on the k dimensional fact space spanned by the k columns of $U_k$. The projection can easily be obtained by $U_k^T q$.

Noting that the mean $\bar{x}$ of the differential intra-(extra-) document vectors is approximately 0, it may be assumed that the differential vectors formed follow a high-dimensional Gaussian distribution so that the likelihood of any differential vector x will be given by $$P(x|D) = \frac{\exp\left[-\frac{1}{2}d(x)\right]}{(2\pi)^{n/2}|\Sigma|^{1/2}},$$

where $d(x)=x^T\Sigma^{-1}x$ and $\Sigma$ is the covariance of the distribution computed from the training set expressed $$\Sigma = \frac{1}{n}DD^T.$$

Since $\delta_1^2$ constitutes the eigen values of $DD^T$, then $S^2=U^TDD^TU$, and thus $d(x)=nx^T(DD^T)^{-1}x=nx^TUS^{-2}U^Tx=ny^TS^{-2}y$, where $y=U^Tx=(y_1,y_2,\ldots,y_n)^T$.

Because S is a diagonal matrix, d(x) can be expressed in a simpler form as $$d(x) = n\sum_{i=1}^{r} \frac{y_i^2}{\delta_i^2}.$$

It is most convenient to estimate it as $$\bar{d}(x) = n\left(\sum_{i=1}^{k} \frac{y_i^2}{\delta_i^2} + \frac{1}{\rho}\sum_{i=k+1}^{r} y_i^2\right).$$

where $$\rho = \frac{1}{r-k}\sum_{i=k+1}^{r} \delta_i^2.$$

In practice, $\delta_1$ (i>k) could be estimated by fitting a function (for example, 1/i) to the available $\delta_1$ (i≦k), or by letting $\rho=\delta_{k+1}^2/2$ since it is only necessary to compare the relative probability. Because the columns of U are orthogonal vectors, $$\sum_{i=k+1}^{r} y_i^2$$

may be estimated by $$\|x\|^2 - \sum_{i=1}^{k} y_i^2.$$

Thus, the likelihood function P(x|D) may be estimated by $$\bar{P}(x|D) = \frac{n^{1/2}\exp\left(-\frac{n}{2}\sum_{i=1}^{k}\frac{y_i^2}{\delta_i^2}\right)\cdot\exp\left(-\frac{n\varepsilon^2(x)}{2\rho}\right)}{(2\pi)^{n/2}\prod_{i=1}^{k}\delta_i \cdot \rho^{(r-k)/2}} \quad (2)$$

where $$y = U_k^T x, \; \varepsilon^2(x) = \|x\|^2 - \sum_{i=1}^{k} y_i^2, \; \rho = \frac{1}{r-k}\sum_{i=k+1}^{r}\delta_i^2,$$

and r is the rank of matrix D.

In practice, $\rho$ may be chosen as $\delta_{k+1}^2/2$, and n may be substituted for r. Note that in equation (2), the term $$\sum \frac{y_i^2}{\delta_i^2}$$

describes the projection of x onto the DLSI space, while $\epsilon(x)$ approximates the distance from x to DLSI space.

When both $P(x|D_I)$ and $P(x|D_E)$ are computed, the Bayesian posteriori function can be computed as:

$$P(D_I, x) = \frac{P(x|D_I)P(D_I)}{P(x|D_I)P(D_I) + P(x|D_E)P(D_E)},$$

where $P(D_I)$ is set to $1/n_c$ where $n_c$ is the number of clusters in the database while $P(D_E)$ is set to $1-P(D_I)$. $P(D_I)$ can also be set to be an average number of recalls divided by the number of clusters in the data base if it is not necessary that the clusters be non-overlapped.

The setting up of a DLSI space-based classifier in accordance with the present invention is summarized in FIG. 1. Documents are preprocessed, step 100, to identify and distinguish terms, either of the word or noun phrase, from stop words. System terms are then constructed, step 110, by setting up the term list as well as the global weights. The process continues with normalization of the document vectors, step 120, of all the collected documents, as well as the centroid vectors of each cluster. Following document vector normalization, the differential term by document matrices may be constructed by intra-document or extra-document construction.

Decomposition of the differential term by intra-document matrix construction, step 130, constructs the differential term by intra-document matrix $D_I^{m \times n_I}$, such that each of its columns is a differential intra-document vector. For a cluster with s elements, m-1 differential intra-document vectors in $D_I$ may be included to avoid the linear dependency among columns.

The differential term is decomposed and approximated, step 140, by intra-document matrix $D_I$, by an SVD algorithm, into $D_I = U_I S_I V_I^T$ ($S_I = \text{diag}(\delta_{I,1}, \delta_{I,2}, \ldots)$), followed by the composition of $D_{I,k_I} = U_{k_I} S_{k_I} V_{k_I}^T$ giving an approximate $D_I$ in terms of an appropriate $k_I$. An intra-differential document vector likelihood function is set up, step 150 according to:

$$P(x|D_I) = \frac{n_I^{1/2} \exp\left(-\frac{n_I}{2} \sum_{i=1}^{k_I} \frac{y_i^2}{\delta_{I,i}^2}\right) \cdot \exp\left(-\frac{n_I \varepsilon^2(x)}{2\rho_I}\right)}{(2\pi)^{n_I/2} \prod_{i=1}^{k_I} \delta_{I,i} \cdot \rho_I^{(r_I-k_I)/2}}, \quad (3)$$

where $$y = U_{k_I}^T x, \; \varepsilon^2(x) = \|x\|^2 - \sum_{i=1}^{k_I} y_i^2, \; \rho_I = \frac{1}{r_I - k_I} \sum_{i=k_I+1}^{r_I} \delta_{I,i}^2,$$

and $r_I$ is the rank of matrix $D_I$. In practice, $r_I$ may be set to $n_I$, and $\rho_I$ to $\delta_{I,k_I+1}^2/2$ if both $n_I$ and m are sufficiently large.

Decomposition of the differential term by extra-document matrix construction, step 160, constructs the term by extra-document matrix $D_E^{m \times n_E}$, such that each of its columns is an extra-differential document vector. The differential term, $D_E$, is decomposed and approximated, step 170, by exploiting the SVD algorithm, into $D_E = U_E S_E V_E^T$ ($S_E = \text{diag}((\delta_{E,1}, \delta_{E,2}, \ldots))$), then with a proper $k_E$, defining the $D_{E,k}^{E,k} = U_{k_E} S_{k_E} V_{k_E}^T$ to approximate $D_E$. An extra-differential document vector likelihood function is set up, step 180, according to:

$$P(x|D_E) = \frac{n_E^{1/2} \exp\left(-\frac{n_E}{2} \sum_{i=1}^{k_E} \frac{y_i^2}{\delta_{E,i}^2}\right) \cdot \exp\left(-\frac{n_E \varepsilon^2(x)}{2\rho_E}\right)}{(2\pi)^{n_E/2} \prod_{i=1}^{k_E} \delta_{E,i} \cdot \rho_E^{(r_E-k_E)/2}}, \quad (4)$$

where $$y = U_{k_E}^T x, \; \varepsilon^2(x) = \|x\|^2 - \sum_{i=1}^{k_E} y_i^2, \; \rho_E = \frac{1}{r_E - k_E} \sum_{i=k_E+1}^{r_E} \delta_{E,i}^2, \; r_E$$

is the rank of matrix $D_E$. In practice, $r_E$ may be set to $n_E$, and $\rho_E$, to $\delta_{E,k_E+1}^2/2$ if both $n_E$ and m are sufficiently large.

Upon conclusion of the intra-document or extra-document matrix construction, a posteriori function is set up, step 190, according to:

$$P(D_I|x) = \frac{P(x|D_I)P(D_I)}{P(x|D_I)P(D_I) + P(x|D_E)P(D_E)}, \quad (5)$$

where $P(D_I)$ is set to $1/n_c$ where $n_c$ is the number of clusters in the database and $P(D_E)$ is set to $1-P(D_I)$.

Figure 2:
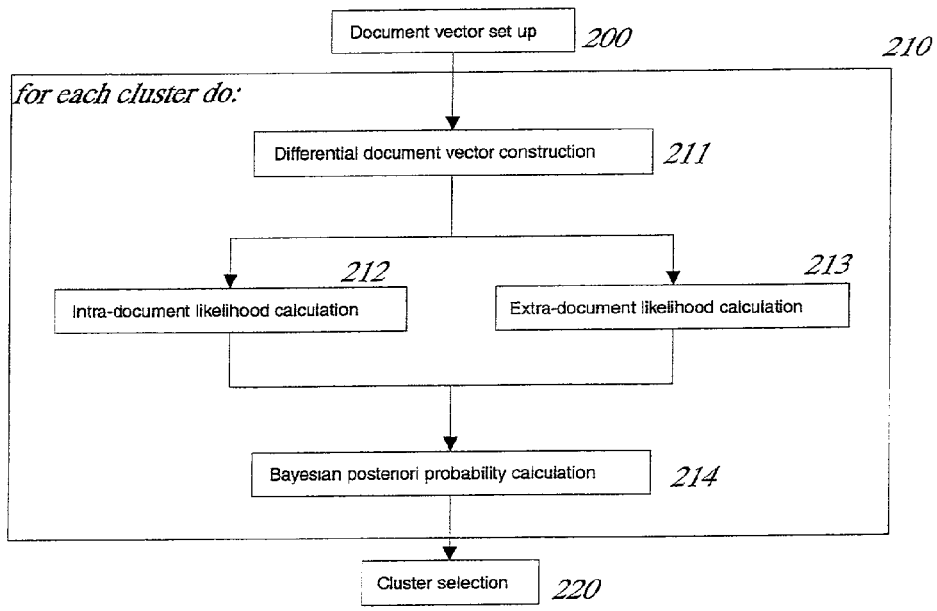
FIG. 2 is a flow diagram of the procedure for automatic classification of a document by a DLSI space-based classifier in accordance with the present invention.

The automatic classification by the DLSI space-based classifier in accordance with the present invention is summarized in FIG. 2. A document vector is set up, step 200, by generating the terms as well as their frequencies of occurrence in the document, so that a normalized document vector N is obtained for the document from equation (1).

A group of procedures, step 210, are then repeated for each of the clusters of the database. More specifically, using the document to be classified, a differential document vector x=N-C, where C is the normalized vector giving the center or centroid of the cluster, is constructed, step 211. As shown in steps 212, 213, either the intra-document likelihood function $P(x|D_I)$, or the extra-document likelihood function $P(x|D_E)$ may be calculated for the document. The Bayesian posteriori probability function $P(D_I|x)$ is then calculated, step 214. Finally, the cluster having a largest $P(D_I|x)$ is selected as the recall candidate, step 220.

The present invention may be demonstrated with the following example. Assume the following eight documents are in the database:

$T_1$: Algebra and Geometry Education System.
$T_2$: The Software of Computing Machinery.
$T_3$: Analysis and Elements of Geometry.
$T_4$: Introduction to Modern Algebra and Geometry.
$T_5$: Theoretical Analysis in Physics.
$T_6$: Introduction to Elements of Dynamics.
$T_7$: Modem Alumina.
$T_8$: The Foundation of Chemical Science.

It is known that these documents belong to four clusters, $T_1, T_2 \in C_1$, $T_3, T_4 \in C_2$, $T_5, T_6 \in C_3$ and $T_7, T_8 \in C_4$ where $C_1$ belongs to computer related field, $C_2$ to mathematics, $C_3$ to physics, and $C_4$ to chemical science. The classifier of the present invention may be set up to classify the following new document, N: "The Elements of Computing Science" as follows.

A conventional matching method of "common" words does not work in this example, because the words "compute" and, "science" in the new document appear in $C_1$ and $C_4$ separately, while the word "elements" occurs in both $C_2$ and $C_3$ simultaneously, giving no indication of the appropriate candidate of classification by simply counting the "common" words among documents.

Setting up the DLSI-based classifier and LSI-based classifier for this example begins by setting up the document vectors of the database giving the term by document matrix as in Table 1 which simply counts the frequency of occurrences; the normalized form is given in Table 2.

TABLE 1

The term by document matrix of the original documents

|  | $T_1$ | $T_2$ | $T_3$ | $T_4$ | $T_5$ | $T_6$ | $T_7$ | $T_8$ |
|---|---|---|---|---|---|---|---|---|
| Algebra | 1 | 0 | 0 | 1 | 0 | 0 | 0 | 0 |
| Alumina | 0 | 0 | 0 | 0 | 0 | 0 | 1 | 0 |
| Analysis | 0 | 0 | 1 | 0 | 1 | 0 | 0 | 0 |
| Chemical | 0 | 0 | 0 | 0 | 0 | 0 | 0 | 1 |
| Compute | 0 | 1 | 0 | 0 | 0 | 0 | 0 | 0 |
| Dynamics | 0 | 0 | 0 | 0 | 0 | 1 | 0 | 0 |
| Education | 1 | 0 | 0 | 0 | 0 | 0 | 0 | 0 |
| Element | 0 | 0 | 1 | 0 | 0 | 1 | 0 | 0 |
| Foundation | 0 | 0 | 0 | 0 | 0 | 0 | 0 | 1 |
| Geometry | 1 | 0 | 1 | 1 | 0 | 0 | 0 | 0 |
| Introduction | 0 | 0 | 0 | 1 | 0 | 1 | 0 | 0 |
| Machine | 0 | 1 | 0 | 0 | 0 | 0 | 0 | 0 |
| Modern | 0 | 0 | 0 | 1 | 0 | 0 | 1 | 0 |
| Physics | 0 | 0 | 0 | 0 | 1 | 0 | 0 | 0 |
| Science | 0 | 0 | 0 | 0 | 0 | 0 | 0 | 1 |
| Software | 0 | 1 | 0 | 0 | 0 | 0 | 0 | 0 |
| System | 1 | 0 | 0 | 0 | 0 | 0 | 0 | 0 |
| Theory | 0 | 0 | 0 | 0 | 1 | 0 | 0 | 0 |

For the DLSI space-based classifier, the normalized form of the centroid of each cluster may be obtained in Table 3:

TABLE 3

The normalized cluster centers

|  | $C_1$ | $C_2$ | $C_3$ | $C_4$ |
|---|---|---|---|---|
| Algebra | 0.353553391 | 0.311446376 | 0 | 0 |
| Alumina | 0 | 0 | 0 | 0.5 |
| Analysis | 0 | 0.359627298 | 0.40824829 | 0 |
| Chemical | 0 | 0 | 0 | 0.40824829 |
| Compute | 0.40824829 | 0 | 0 | 0 |
| Dynamics | 0 | 0 | 0.40824829 | 0 |
| Education | 0.353553391 | 0 | 0 | 0 |
| Element | 0 | 0.359627298 | 0.40824829 | 0 |
| Foundation | 0 | 0 | 0 | 0.40824829 |
| Geometry | 0.353553391 | 0.671073675 | 0 | 0 |
| Introduction | 0 | 0.311446376 | 0.40824829 | 0 |
| Machine | 0.40824829 | 0 | 0 | 0 |
| Modern | 0 | 0.311446376 | 0 | 0.5 |
| Physics | 0 | 0 | 0.40824829 | 0 |
| Science | 0 | 0 | 0 | 0.40824829 |
| Software | 0.40824829 | 0 | 0 | 0 |
| System | 0.353553391 | 0 | 0 | 0 |
| Theory | 0 | 0 | 0.40824829 | 0 |

Following the procedure of the previous section, both the interior differential term by document matrix $D_I^{18 \times 4}$ and the exterior differential term by document matrix $D_E^{18 \times 4}$ may be constructed as in Table 4 and Table 5, respectively.

TABLE 4

Interior Differential term by document matrix

|  | $T_1$-$C_1$ | $T_3$-$C_2$ | $T_5$-$C_3$ | $T_7$-$C_4$ |
|---|---|---|---|---|
| Algebra | 0.146446609 | −0.31144638 | 0 | 0 |
| Alumina | 0 | 0 | 0 | 0.207106781 |
| Analysis | 0 | 0.217722971 | 0.169101979 | 0 |
| Chemical | 0 | 0 | 0 | −0.40824829 |
| Compute | −0.40824829 | 0 | 0 | 0 |
| Dynamics | 0 | 0 | −0.40824829 | 0 |
| Education | 0.146446609 | 0 | 0 | 0 |

TABLE 2

The normalized document vectors

|  | $T_1$ | $T_2$ | $T_3$ | $T_4$ | $T_5$ | $T_6$ | $T_7$ | $T_8$ |
|---|---|---|---|---|---|---|---|---|
| Algebra | 0.5 | 0 | 0 | 0.5 | 0 | 0 | 0 | 0 |
| Alumina | 0 | 0 | 0 | 0 | 0 | 0 | 0.707106781 | 0 |
| Analysis | 0 | 0 | 0.577350269 | 0 | 0.577350269 | 0 | 0 | 0 |
| Chemical | 0 | 0 | 0 | 0 | 0 | 0 | 0 | 0.577350269 |
| Compute | 0 | 0.577350269 | 0 | 0 | 0 | 0 | 0 | 0 |
| Dynamics | 0 | 0 | 0 | 0 | 0 | 0.577350269 | 0 | 0 |
| Education | 0.5 | 0 | 0 | 0 | 0 | 0 | 0 | 0 |
| Element | 0 | 0 | 0.577350269 | 0 | 0 | 0.577350269 | 0 | 0 |
| Foundation | 0 | 0 | 0 | 0 | 0 | 0 | 0 | 0.577350269 |
| Geometry | 0.5 | 0 | 0.577350269 | 0.5 | 0 | 0 | 0 | 0 |
| Introduction | 0 | 0 | 0 | 0.5 | 0 | 0.577350269 | 0 | 0 |
| Machine | 0 | 0.577350269 | 0 | 0 | 0 | 0 | 0 | 0 |
| Modern | 0 | 0 | 0 | 0.5 | 0 | 0 | 0.707106781 | 0 |
| Physics | 0 | 0 | 0 | 0 | 0.577350269 | 0 | 0 | 0 |
| Science | 0 | 0 | 0 | 0 | 0 | 0 | 0 | 0.577350269 |
| Software | 0 | 0.577350269 | 0 | 0 | 0 | 0 | 0 | 0 |
| System | 0.5 | 0 | 0 | 0 | 0 | 0 | 0 | 0 |
| Theory | 0 | 0 | 0 | 0 | 0.577350269 | 0 | 0 | 0 |

The document vector for the new document N is given by: $(0, 0, 0, 0, 1, 0, 0, 1, 0, 0, 0, 0, 0, 0, 1, 0, 0, 0)^T$, and in normalized form by $0, 0, 0, 0, 0.577350269, 0, 0, 0.577350269, 0, 0, 0, 0, 0, 0, 0.0577350269, 0, 0, 0)^T$.

TABLE 4-continued

Interior Differential term by document matrix

| | $T_1$-$C_1$ | $T_3$-$C_2$ | $T_5$-$C_3$ | $T_7$-$C_4$ |
|---|---|---|---|---|
| Element | 0 | 0.217722971 | −0.40824829 | 0 |
| Foundation | 0 | 0 | 0 | −0.40824829 |
| Geometry | 0.146446609 | −0.09372341 | 0 | 0 |
| Introduction | 0 | −0.31144638 | −0.40824829 | 0 |
| Machinery | −0.40824829 | 0 | 0 | 0 |
| Modern | 0 | −0.31144638 | 0 | 0.207106781 |
| Physics | 0 | 0 | 0.169101979 | 0 |
| Science | 0 | 0 | 0 | −0.40824829 |
| Software | −0.40824829 | 0 | 0 | 0 |
| System | 0.146446609 | 0 | 0 | 0 |
| Theory | 0 | 0 | 0.169101979 | 0 |

TABLE 5

Exterior differential term by document matrix

| | $T_2$-$C_2$ | $T_4$-$C_3$ | $T_6$-$C_4$ | $T_8$-$C_1$ |
|---|---|---|---|---|
| Algebra | −0.311446376 | 0.5 | 0 | −0.353553391 |
| Alumina | 0 | 0 | −0.5 | 0 |
| Analysis | −0.359627298 | −0.40824829 | 0 | 0 |
| Chemical | 0 | 0 | −0.40824829 | 0.577350269 |
| Compute | 0.577350269 | 0 | 0 | −0.40824829 |
| Dynamics | 0 | −0.40824829 | 0.577350269 | 0 |
| Education | 0 | 0 | 0 | −0.353553391 |
| Element | −0.359627298 | −0.40824829 | 0.577350269 | 0 |
| Foundation | 0 | 0 | −0.40824829 | 0.577350269 |
| Geometry | −0.671073675 | 0.5 | 0 | −0.353553391 |
| Introduction | −0.311446376 | 0.09175171 | 0.577350269 | 0 |
| Machinery | 0.577350269 | 0 | 0 | −0.40824829 |
| Modern | −0.311446376 | 0.5 | −0.5 | 0 |
| Physics | 0 | −0.40824829 | 0 | 0 |
| Science | 0 | 0 | −0.40824829 | 0.577350269 |
| Software | 0.577350269 | 0 | 0 | −0.40824829 |
| System | 0 | 0 | 0 | −0.353553391 |
| Theory | 0 | −0.40824829 | 0 | 0 |

Once the $D_I$ and $D_E$ are given, they are decomposed into $D_I = U_I S_I V_I^T$ and $D_E = U_E S_E V_{EI}^T$ by using SVD algorithm, where $$U_I = \begin{pmatrix} 0.25081 & 0.0449575 & -0.157836 & -0.428217 \\ 0.130941 & 0.172564 & 0.143423 & 0.0844264 \\ -0.240236 & 0.162075 & -0.043428 & 0.257507 \\ -0.25811 & -0.340158 & -0.282715 & -0.166421 \\ -0.237435 & -0.125328 & 0.439997 & -0.15309 \\ 0.300435 & -0.391284 & 0.104845 & 0.193711 \\ 0.0851724 & 0.0449575 & -0.157836 & 0.0549164 \\ 0.184643 & -0.391284 & 0.104845 & 0.531455 \\ -0.25811 & -0.340158 & -0.282715 & -0.166421 \\ 0.135018 & 0.0449575 & -0.157836 & -0.0904727 \\ 0.466072 & -0.391284 & 0.104845 & -0.289423 \\ -0.237435 & -0.125328 & 0.439997 & -0.15309 \\ 0.296578 & 0.172564 & 0.143423 & -0.398707 \\ -0.124444 & 0.162075 & -0.043428 & -0.0802377 \\ -0.25811 & -0.340158 & -0.282715 & -0.166421 \\ -0.237435 & -0.125328 & 0.439997 & -0.15309 \\ 0.0851724 & 0.0449575 & -0.157836 & 0.0549164 \\ -0.124444 & 0.162075 & -0.043428 & -0.0802377 \end{pmatrix}$$

$$S_I = diag(0.800028, 0.765367, 0.765367, 0.583377)$$

$$V_1 = \begin{pmatrix} 0.465291 & 0.234959 & -0.824889 & 0.218762 \\ -0.425481 & -2.12675E\text{-}9 & 1.6628E\text{-}9 & 0.904967 \\ -0.588751 & 0.733563 & -0.196558 & -0.276808 \\ 0.505809 & 0.637715 & 0.530022 & 0.237812 \end{pmatrix}$$

$$U_E = \begin{pmatrix} 0.00466227 & -0.162108 & 0.441095 & 0.0337051 \\ -0.214681 & 0.13568 & 0.0608733 & -0.387353 \\ 0.0265475 & -0.210534 & -0.168537 & -0.529866 \\ -0.383378 & 0.047418 & -0.195619 & 0.0771912 \\ 0.216445 & 0.397068 & 0.108622 & 0.00918756 \\ 0.317607 & -0.147782 & -0.27922 & 0.0964353 \\ 0.12743 & 0.0388027 & 0.150228 & -0.240946 \\ 0.27444 & -0.367204 & -0.238827 & -0.0825893 \\ -0.383378 & 0.047418 & -0.195619 & 0.0771912 \\ -0.0385053 & -0.38153 & 0.481487 & -0.145319 \\ 0.19484 & -0.348692 & 0.0116464 & 0.371087 \\ 0.216445 & 0.397068 & 0.108622 & 0.00918756 \\ -0.337448 & -0.0652302 & 0.351739 & -0.112702 \\ 0.069715 & 0.00888817 & -0.208929 & -0.350841 \\ -0.383378 & 0.047418 & -0.195619 & 0.0771912 \\ 0.216445 & 0.397068 & 0.108622 & 0.00918756 \\ 0.12743 & 0.0388027 & 0.150228 & -0.240946 \\ 0.069715 & 0.00888817 & -0.208929 & -0.350841 \end{pmatrix}$$

$$S_E = diag(1.67172, 1.47695, 1.45881, 0.698267)$$

$$V_E = \begin{pmatrix} 0.200663 & 0.901144 & -0.163851 & 0.347601 \\ -0.285473 & -0.0321555 & 0.746577 & 0.600078 \\ 0.717771 & -0.400787 & -0.177605 & 0.540952 \\ -0.60253 & -0.162097 & -0.619865 & 0.475868 \end{pmatrix}$$

The number k is chosen in such a way that $\delta_k - \delta_{k+1}$ remains sufficiently large. As an example to test the classifier, $k_I = k_E = 1$ and $k_I = k_E = 3$. Now using equations (3), (4) and (5), it is possible to calculate the $P(x|D_I)$, $P(x|D_E)$ and finally $P(D_I|x)$ for each differential document vector $x = N - C_i$ ($i = 1, 2, 3, 4$) as shown in Table 6. The $C_i$ having a largest $P(D_I(N-C_i))$ is chosen as the cluster to which the new document N belongs. Note that, we here set $$\rho_I = \frac{1}{r_I - k_I} \sum_{i=k_I+1}^{r_I} \delta_{I,i}^2, \quad \rho_E = \frac{1}{r_E - k_E} \sum_{i=k_E+1}^{r_E} \delta_{E,i}^2$$

since both $n_E$ are actually quite small. From the last row of Table 6, it can be seen that Cluster 2 should be chosen, that is, "Mathematics", regardless of whether the set of parameters $k_I = k_E = 1$ or $k_I = k_E = 3$ is chosen.

TABLE 6

Classification with DLSI space based classifier

| | $k_I = k_E = 1$ | | | | $k_I = k_E = 3$ | | | |
|---|---|---|---|---|---|---|---|---|
| X: | N − C₁ | N − C₂ | N − C₃ | N − C₄ | N − C₁ | N − C₂ | N − C₃ | N − C₄ |
| $U_{k_I}^T x$ | −0.085338834 | −0.565752063 | −0.368120678 | −0.077139955 | −0.085338834 | −0.556196907 | −0.368120678 | −0.077139955 |
| | | | | | −0.404741071 | −0.403958563 | −0.213933843 | −0.250613624 |
| | | | | | −0.164331163 | 0.249931018 | 0.076118938 | 0.35416984 |
| $P(x \setminus D_I)$ | 0.000413135 | 0.000430473 | 0.00046034 | 0.000412671 | 3.79629E-05 | 7.03221E-05 | 3.83428E-05 | 3.75847E-05 |
| $U_{k_E}^T x$ | −0.281162007 | 0.022628465 | −0.326936108 | 0.807673935 | −0.281162007 | −0.01964297 | −0.326936108 | 0.807673935 |
| | | | | | −0.276920807 | 0.6527666 | 0.475906836 | −0.048681069 |
| | | | | | −0.753558043 | −0.619983845 | 0.258017361 | −0.154837357 |
| $P(x \setminus D_E)$ | 0.002310807 | 0.002065451 | 0.002345484 | 0.003140447 | 0.003283825 | 0.001838634 | 0.001627501 | 0.002118787 |
| $P(D_I \setminus x)$ | 0.056242843 | 0.064959115 | 0.061404975 | 0.041963635 | 0.003838728 | 0.012588493 | 0.007791905 | 0.005878172 |

The LSI based-classifier works by first employing an SVD algorithm on the term by document matrix to set up a LSI space; then the classification is completed within the LSI space.

For the current simple example, the LSI-based classifier could be set up as follows. First, the SVD is used to decompose the normalized term by document matrix as shown in Table 2. Second, the LSI space is selected. Third, the approximate documents for all the documents $T_1, T_2 \ldots, T_8$ in the LSI space are located. Fourth, the centroid of each cluster is found, and finally the similarity of the document vector for the new document N to be classified is calculated, obtaining the centroid vector based on the cosine formula, and finding the cluster having a largest similarity with the document vector to be classified.

The normalized term by document matrix D of Table 2 is decomposed into $USV^T$ by an SVD algorithm, where $$U = \begin{pmatrix}
-0.371982 & 0.239604 & -0.333537 & 0.0378007 & 2.79314E\text{-}17 & 4.54904E\text{-}17 & -0.297399 & -0.0931117 \\
-0.109476 & 0.316205 & 0.415044 & 0.308779 & 9.62361E\text{-}7 & -1.79246E\text{-}6 & 0.238807 & 0.423668 \\
-0.279847 & -0.539958 & 0.0815064 & 0.346579 & 9.62361E\text{-}7 & -1.79246E\text{-}6 & 0.208068 & -0.089806 \\
-3.78408E\text{-}19 & -3.00383E\text{-}17 & -7.51455E\text{-}9 & -6.63053E\text{-}8 & -0.503085 & -0.283265 & 8.14276E\text{-}19 & 1.20574E\text{-} \\
-1.44898E\text{-}16 & 3.62379E\text{-}16 & 3.74051E\text{-}7 & 3.30047E\text{-}6 & -0.283265 & 0.503085 & -1.0325E\text{-}16 & 1.28189E\text{-}1 \\
-0.145675 & -0.0994425 & 0.252031 & -0.38438 & -9.62361E\text{-}7 & 1.79246E\text{-}6 & -0.229976 & 0.367524 \\
-0.163994 & 0.0835204 & -0.333537 & 0.0378007 & -1.63966E\text{-}17 & -5.09886E\text{-}18 & -0.0530789 & 0.487477 \\
-0.352831 & -0.329155 & 0.252031 & -0.38438 & -9.62361E\text{-}7 & 1.79246E\text{-}6 & 0.367272 & 0.192638 \\
-1.31025E\text{-}19 & -2.01525E\text{-}17 & -7.51455E\text{-}9 & -6.63053E\text{-}8 & -0.503085 & -0.283265 & -4.86527E\text{-}17 & -3.33189E \\
-0.579138 & 0.00989091 & -0.333537 & 0.0378007 & -1.06161E\text{-}16 & 7.57296E\text{-}17 & 0.29985 & -0.267997 \\
-0.353663 & 0.0566407 & 0.252031 & -0.38438 & -9.62361E\text{-}7 & 1.79246E\text{-}6 & -0.474296 & -0.21306 \\
-1.44983E\text{-}16 & 3.58996E\text{-}16 & 3.74051E\text{-}7 & 3.30047E\text{-}6 & -0.283265 & 0.503085 & -8.6321E\text{-}17 & 1.29742E \\
-0.317464 & 0.472288 & 0.415044 & 0.308779 & 9.62361E\text{-}7 & -1.79246E\text{-}6 & -0.00551332 & -0.15692 \\
-0.0726917 & -0.310246 & 0.0815064 & 0.346579 & 9.62361E\text{-}7 & -1.79246E\text{-}6 & -0.389181 & 0.085078 \\
-1.31025E\text{-}19 & -2.01525E\text{-}17 & -7.51455E\text{-}9 & -6.63053E\text{-}8 & -0.503085 & -0.283265 & -4.86527E\text{-}17 & -3.33189E \\
-1.44983E\text{-}16 & 3.58996E\text{-}16 & 3.74051E\text{-}7 & 3.30047E\text{-}6 & -0.283265 & 0.503085 & -8.6321E\text{-}17 & 1.29742E\text{-} \\
-0.163994 & 0.0835204 & -0.333537 & 0.0378007 & 9.46257E\text{-}17 & -1.16121E\text{-}16 & -0.0530789 & 0.487477 \\
-0.0726917 & -0.310246 & 0.0815064 & 0.346579 & 9.62361E\text{-}7 & -1.79246E\text{-}6 & -0.389181 & 0.0850784
\end{pmatrix}$$

$$S = diag(1.3964, 1.11661, 1., 1., 1., 1., 0.698897, 0.561077)$$

-continued
$$V = \begin{pmatrix} -0.458003 & 0.186519 & -0.667075 & 0.0756013 & 0 & 0 & -0.0741933 & 0.547024 \\ -3.22687E\text{-}16 & 6.47125E\text{-}16 & 6.47876E\text{-}7 & 5.71659E\text{-}6 & -0.490629 & 0.871369 & -1.51577E\text{-}16 & 8.30516E\text{-}17 \\ -0.501034 & -0.444268 & 1.42655E\text{-}10 & 5.11457E\text{-}11 & -1.65476E\text{-}17 & -1.46367E\text{-}16 & 0.722984 & -0.169956 \\ -0.580868 & 0.348567 & 3.44631E\text{-}10 & -1.24557E\text{-}10 & -1.55908E\text{-}16 & 3.51498E\text{-}16 & -0.341509 & -0.65151 \\ -0.175814 & -0.60002 & 0.141173 & 0.600293 & 1.66686E\text{-}6 & -3.10464E\text{-}6 & -0.471113 & 0.0826804 \\ -0.352335 & -0.192324 & 0.43653 & -0.665766 & -1.66686E\text{-}6 & 3.10464E\text{-}6 & -0.278392 & 0.357165 \\ -0.216193 & 0.499324 & 0.586961 & 0.436679 & 1.36098E\text{-}6 & -2.53493E\text{-}6 & 0.236034 & 0.336173 \\ -3.16901E\text{-}19 & -3.89753E\text{-}17 & -1.30156E\text{-}8 & -1.14844E\text{-}7 & -0.871369 & -0.490629 & -5.88953E\text{-}17 & -3.23798E\text{-}18 \end{pmatrix}$$

As in the DLSI computation, the number k used in computing the largest eigen values is chosen such that $\delta_k - \delta_{k+1}$ is sufficiently large. As an example to set up the classifier for testing the result, make k=6 and k=2. Noting that the similarity is calculated as the angle between vectors in LSI space, the dimension of the LSI space should be at least two so that k should be larger than one. Once k is chosen, the term by document matrix D may be approximated by $D_k = U_k S_k V_k^T$. Thus, the projection of the document $T_1$ onto the LSI space is calculated to be $S_k V_k^T e_I$ with $e_1$ being defined as the ith column of an 8×8 identity matrix. These projections of documents are shown in Table 7. Since the similarity is calculated by a cosine of angles in the LSI space, the centroid vector of each cluster should be calculated as a mean of the member documents normalized. These centroid vectors are shown in Table 8, where $C_I$ in the table indicates the centroids of cluster $C_I$. The projection of the document to be classified, document N, in the LSI space is also shown in Table 8, where the projection is calculated as $U_k^T N$, with N being the normalized vector. The similarity between a centroid vector and the document in LSI space is calculated according to cosine of the angle between in the space, expressed as $$\text{Cosine}(C_i, N) = \frac{C_i U_k^T N}{\|C_i\|_2 \|U_k^T N\|_2}.$$

The results of the similarity are shown in Table 9, and imply that for both cases of k=2 and k=6, the most likely cluster to which the document N belongs is $C_3$, namely "Physics".

TABLE 7

Location of all the files in LSI space

| | $T_1$ | $T_2$ | $T_3$ | $T_4$ | $T_5$ | $T_6$ | $T_7$ | $T_8$ |
|---|---|---|---|---|---|---|---|---|
| k = 6 | −0.639555 | −4.50600E-16 | −0.699644 | −0.811124 | −0.245507 | −0.492001 | −0.301892 | −4.42521E-19 |
| | 0.208269 | 7.22586E-16 | −0.496074 | 0.389213 | −0.669988 | −0.214751 | 0.55755 | −4.35202E-17 |
| | −0.667075 | 6.47876E-07 | 1.42655E-10 | 3.44631E-10 | 0.141173 | 0.43653 | 0.586961 | −1.30156E-08 |
| | 0.0756013 | 5.71659E-06 | 5.11457E-11 | −1.24557E-10 | 0.600293 | −0.665766 | 0.436679 | −1.14844E-07 |
| | 0 | −0.490629 | −1.65476E-17 | −1.55908E-16 | 1.66686E-06 | −1.66686E-06 | 1.36098E-06 | −0.871369 |
| | 0 | 0.871369 | −1.46367E-16 | 3.51498E-16 | −3.10464E-06 | 3.10464E-06 | −2.53493E-06 | −0.490629 |
| k = 2 | −0.639555 | −4.50600E-16 | −0.699644 | −0.811124 | −0.245507 | −0.492001 | −0.301892 | −4.42521E-19 |
| | 0.208269 | 7.22586E-16 | −0.496074 | 0.389213 | −0.669988 | −0.214751 | 0.55755 | −4.35202E-17 |

TABLE 8

Centroids of clusters and the projection of document N onto the LSI space

| | $C_1$ | $C_2$ | $C_3$ | $C_4$ | $U_k^T N$ |
|---|---|---|---|---|---|
| K = 6 | −0.336493975 | −0.858665634 | −0.386356375 | −0.155920264 | −0.203707073 |
| | 0.109578165 | −0.0728915.73 | −0.467030951 | 0.287961732 | −0.190037728 |
| | −0.350972959 | 2.74696E-10 | 0.302156932 | 0.30315183 | 0.145510377 |
| | 0.03977955 | −3.94068E-11 | −0.028425618 | 0.225534588 | −0.221920029 |
| | −0.245314408 | −9.62941E-17 | 1.57379E-08 | −0.435683634 | −0.45399994 |
| | 0.435684337 | 1.10019E-16 | −2.93130E-08 | −0.245315717 | 0.126914171 |
| k = 2 | −0.739996822 | −0.858665634 | −0.630280736 | −0.243155737 | −0.203707073 |
| | 0.579088223 | −0.072891573 | −0.669492215 | −0.060290444 | −0.190037728 |

TABLE 9

Cosine of the projections of the centers and the document in LSI space

| | Cosine ($C_1$, N) | Cosine ($C_2$, N) | Cosine ($C_3$, N) | Cosine ($C_4$, N) |
|---|---|---|---|---|
| k = 6 | 0.359061035 | 0.359993858 | 0.527874697 | 0.320188454 |
| k = 2 | 0.15545458 | 0.78629345 | 0.997897255 | 0.873890479 |

For this simple example, the DLSI space-based approach finds the most reasonable cluster for the document "The Elements of Computing Science" from the classifiers using either one or three dimensions for the DLSI-I and DLSI-E spaces.

The LSI approach, however, fails to predict this for both of the classifiers computed using two or four dimensional LSI space. It should be noted that for the particular example, one or three dimensions for DLSI space, and two or four dimensions for the LSI space represent the most reasonable dimensions to choose.

Although only one example has been explained in detail, it is to be understood that the example has been given by way of illustration only. Accordingly, the foregoing description should be considered as illustrative only of the principles of the invention. The invention may be configured to address various document classification tasks and numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A method of setting up a DLSI space-based classifier to be stored in a computer storage device for document classification using a computer, and using said classifier by said computer to classify a document according to a plurality of clusters within a database, comprising the steps of:
   preprocessing documents using said computer to distinguish terms of a word and a noun phrase from stop words;
   constructing system terms by setting up a term list as well as global weights using said computer;
   normalizing document vectors of collected documents, as well as centroid vectors of each cluster using said computer;
   constructing a differential term by intra-document matrix $D_I^{m \times n_I}$ using said computer, such that each column in said matrix is a differential intra-document vector;
   decomposing the differential term by intra-document matrix $D_I$, by an SVD algorithm using said computer, into $D_I = U_I S_I V_I^T (S_I = \text{diag}(\delta_{I,1}, \delta_{I,2}, \ldots))$, followed by a composition of $D_{I,k_I} = U_{k_I} S_{k_I} V_{k_I}^T$ giving an approximate $D_I$ in terms of an appropriate $k_I$;
   setting up a likelihood function of intra-differential document vector using said computer;
   constructing a term by extra-document matrix $D_E^{m \times n_E}$ using said computer, such that each column of said extra-document matrix is an extra-differential document vector;
   decomposing $D_E$, by exploiting the SVD algorithm using said computer, into $D_E = U_E S_E V_E^T (S_E = \text{diag}(\delta_{E,1}, \delta_{E,2}, \ldots))$, then with a proper $k_E$, defining $D_E^{E,k} = U_{k_E} S_{k_E} V_{k_E}^T$ to approximate $D_E$;
   setting up a likelihood function of extra-differential document vector using said computer;
   setting up a posteriori function using said computer; and
   said computer using said DLSI space-based classifier, as set up in the foregoing steps, to classify the document as belonging to one of the plurality of clusters within the database.

2. An automatic document classification method using a DLSI space-based classifier operating on a computer as a computerized classifier to classify a document in accordance with clusters in a database, comprising the steps of:
   a) setting up, by said computerized classifier, a document vector by generating terms as well as frequencies of occurrence of said terms in the document, so that a normalized document vector N is obtained for the document;
   b) constructing, by said computerized classifier, using the document to be classified, a differential document vector $x = N - C$, where C is the normalized vector giving a center or centroid of a cluster;
   c) calculating an intra-document likelihood function $P(x|D_I)$ for the document using said computerized classifier;
   d) calculating an extra-document likelihood function $P(x|D_E)$ for the document using said computerized classifier;
   e) calculating a Bayesian posteriori probability function using said computerized classifier $P(D_I|x)$;
   f) repeating, for each of the clusters of the data base, steps b–e;
   g) selecting, by said computerized classifier, a cluster having a largest $P(D_I|x)$ as the cluster to which the document most likely belongs; and
   h) classifying, by said computerized classifier, the document in the selected cluster within said database thereby categorizing said document for an automated document retrieval system.

3. The method as set forth in claim 2, wherein the normalized document vector N is obtained using an equation, $$b_{ij} = a_{ij} \Big/ \sqrt{\sum_{k=1}^{m} a_{kj}^2}.$$

4. A method of setting up a DLSI space-based classifier to be stored in a computer storage device for document classification using a computer, and using said classifier by said computer to classify a document according to a plurality of clusters within a database, comprising the steps of:
   setting up, using said computer, a differential term by intra-document matrix where each column of the matrix denotes a difference between a document and a centroid of a cluster to which the document belongs;
   decomposing, using said computer, the differential term by intra-document matrix by an SVD algorithm to identify an intra-DLSI space;
   setting up, using said computer, a probability function for a differential document vector being a differential intra-document vector;
   calculating, using said computer, the probability function according to projection and distance from the differential document vector to the intra-DLSI space;
   setting up, using said computer, a differential term by extra-document matrix where each column of the matrix denotes a differential document vector between a document vector and a centroid vector of a cluster which does not include the document;
   decomposing, using said computer, the differential term by extra-document matrix by an SVD algorithm to identify an extra-DLSI space;
   setting up, using said computer, a probability function for a differential document vector being a differential extra-document vector;
   setting up, using said computer, a posteriori likelihood function using the differential intra-document and differential extra-document vectors to provide a most probable similarity measure of a document belonging to a given cluster; and said computer using said DLSI space-based classifier, as set up in the foregoing steps, to classify the document as belonging to one of the plurality of clusters within the database.

5. The method as set forth in claim 4, wherein the step of setting up a probability function for a differential document vector being a differential intra-document vector is performed using an equation, $$P(x|D_I) = \frac{n_I^{1/2} \exp\left(-\frac{n_I}{2} \sum_{i=1}^{k_I} \frac{y_i^2}{\delta_{I,i}^2}\right) \cdot \exp\left(-\frac{n_I \varepsilon^2(x)}{2\rho_I}\right)}{(2\pi)^{n_I/2} \prod_{i=1}^{k_I} \delta_{I,i} \cdot \rho^{(r_I - k_I)/2}},$$

where $y = U_{k_I}^T x$, $\varepsilon^2(x) = \|x\|^2 - \sum_{i=1}^{k_I} y_i^2$, $\rho_I = \frac{1}{r_I - k_I} \sum_{i=k_I+1}^{r_I} \delta_{I,i}^2$, and $r_I$ is the rank of matrix $D_I$.

6. The method as set forth in claim 4, wherein the step of setting up a probability function for a differential document vector being a differential extra-document vector is performed using an equation, $$P(x|D_E) = \frac{n_E^{1/2} \exp\left(-\frac{n_E}{2} \sum_{i=1}^{k_E} \frac{y_i^2}{\delta_{E,i}^2}\right) \cdot \exp\left(-\frac{n_E \varepsilon^2(x)}{2\rho_E}\right)}{(2\pi)^{n_E/2} \prod_{i=1}^{k_E} \delta_{E,i} \cdot \rho_E^{(r_E - k_E)/2}},$$

where $y = U_{k_E}^T x$, $\varepsilon^2(x) = \|x\|^2 - \sum_{i=1}^{k_E} y_i^2$, $\rho_E = \frac{1}{r_E - k_E} \sum_{i=k_E+1}^{r_E} \delta_{E,i}^2$, $r_E$ is the rank of matrix $D_E$.

7. The method as set forth in claim 4, wherein the step of setting up a posteriori likelihood function is performed using an equation, $$P(D_I|x) = \frac{P(x|D_I)P(D_I)}{P(x|D_I)P(D_I) + P(x|D_E)P(D_E)},$$

where $P(D_I)$ is set to $1/n_c$ where $n_c$ is the number of clusters in the database and $P(D_E)$ is set to $1P(D_I)$.

8. The method as set forth in claim 4, the step of said computer using the DLSI space-based classifier to classify the document comprising the steps of:

a) setting up a document vector by generating terms as well as frequencies of occurrence of said terms in the document, so that a normalized document vector N is obtained for the document;

b) constructing, using the document to be classified, a differential document vector x=N−C, where C is the normalized vector giving a center or centroid of a cluster;

c) calculating an intra-document likelihood function $P(x|D_I)$ for the document;

d) calculating an extra-document likelihood function $P(x|D_E)$ for the document;

e) calculating a Bayesian posteriori probability function $P(D_I|x)$;

f) repeating, for each of the clusters of the data base, steps b–e;

g) selecting a cluster having a largest $P(D_I|x)$ as the cluster to which the document most likely belongs; and h) classifying the document in the selected cluster.

9. The method as set forth in claim 8, wherein the normalized document vector N is obtained using an equation, $$b_{ij} = a_{ij} \Big/ \sqrt{\sum_{k=1}^{m} a_{kj}^2}.$$

* * * * *